(12) United States Patent
Michener

(10) Patent No.: US 11,879,518 B2
(45) Date of Patent: Jan. 23, 2024

(54) SUSPENSION SYSTEM WITH IMPROVED ARTICULATION

(71) Applicant: Ford Global Technologies, LLC, Dearborn, MI (US)

(72) Inventor: Jason Michener, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 92 days.

(21) Appl. No.: 17/569,254

(22) Filed: Jan. 5, 2022

(65) Prior Publication Data

US 2023/0213081 A1 Jul. 6, 2023

(51) Int. Cl.
| | |
|---|---|
| *B60G 17/015* | (2006.01) |
| *F16F 9/46* | (2006.01) |
| *B60G 17/08* | (2006.01) |
| *B60G 13/08* | (2006.01) |
| *F16F 9/512* | (2006.01) |

(52) U.S. Cl.
CPC .............. *F16F 9/461* (2013.01); *B60G 13/08* (2013.01); *B60G 17/08* (2013.01); *F16F 9/5126* (2013.01); *B60G 2202/24* (2013.01)

(58) Field of Classification Search
CPC ........ F16F 9/461; F16F 9/5126; B60G 13/08; B60G 17/08; B60G 17/016; B60G 17/0162; B60G 17/0165; B60G 2202/24

USPC ....................... 188/266, 284–287; 267/64.16; 280/5.504, 5.506, 5.507, 5.512–5.514, 280/5.519, 6.154, 124.104, 124.106

See application file for complete search history.

(56) References Cited

U.S. PATENT DOCUMENTS

| | | | |
|---|---|---|---|
| 6,952,637 B2 | 10/2005 | Barron | |
| 7,740,256 B2 | 6/2010 | Davis et al. | |
| 9,205,717 B2* | 12/2015 | Brady | ................ B60G 17/0165 |
| 10,350,957 B2 | 7/2019 | Anderson | |
| 10,899,340 B1 | 1/2021 | Hitzinger | |
| 11,077,733 B2* | 8/2021 | Crane | ................... B60G 17/027 |
| 2015/0088379 A1* | 3/2015 | Hirao | ................... B60G 17/016 701/37 |
| 2019/0359025 A1 | 11/2019 | Wager | |
| 2020/0207176 A1* | 7/2020 | Baker | ................ B60G 17/0525 |
| 2022/0324281 A1* | 10/2022 | Isshiki | ............... B60G 17/0162 |

* cited by examiner

*Primary Examiner* — Christopher P Schwartz
(74) *Attorney, Agent, or Firm* — Burr & Forman LLP

(57) ABSTRACT

An adaptive suspension damper may include a body defining a working chamber, and a sleeve operably coupled to the body to alternately open the working chamber to enable a working fluid to enter or leave the working chamber relative to compression and rebound events experienced at the adaptive suspension damper, and close the working chamber to enable the piston head to act as a hydraulic ram inside the working chamber to selectively adjust a position of a piston head in the working chamber to adjust a height of a corner of a vehicle at which the adaptive suspension damper is located.

19 Claims, 8 Drawing Sheets

FIG. 1B
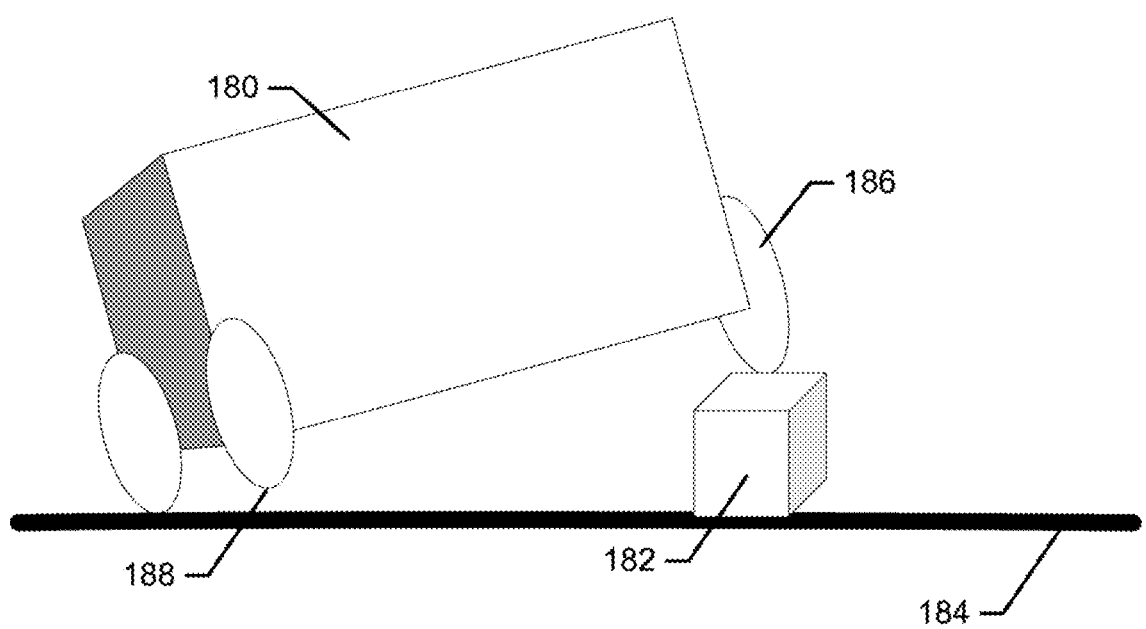
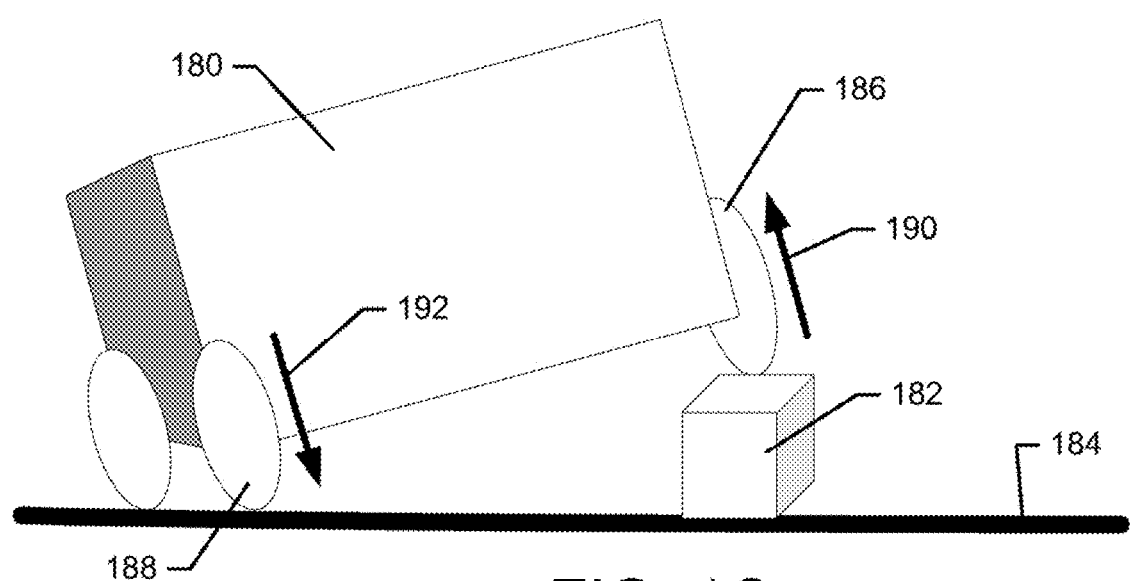
FIG. 1C

SUSPENSION SYSTEM WITH IMPROVED ARTICULATION

TECHNICAL FIELD

Example embodiments generally relate to vehicle suspension and, more particularly, relate to a suspension system with a capability to transform into an active suspension with individual corners having increased articulation.

BACKGROUND

Vehicles commonly employ independent suspension that allows each wheel to move relative to the vehicle chassis independent of the other wheels. The components and geometries used for independent suspension designs can vary to some degree. However, a typical independent suspension system will employ shock absorbers (or simply "shocks") that are designed to provide damping for heave (i.e. oscillation along the vertical axis of the vehicle) pitch (i.e., oscillation about a lateral axis of the vehicle), roll (i.e., oscillation about a longitudinal axis of the vehicle) and individual wheel disturbances that may be encountered. The shocks generally resist compression and rebound with damping forces that are applied over a range of travel of a piston rod.

The shocks selected for a particular vehicle are generally chosen based on the expectation of normal pitch, roll and individual wheel event scenarios that are encountered during routine driving conditions. Meanwhile, high performance vehicles, or vehicles that are designed to be operated off-road, may encounter levels of heave, pitch, roll and wheel events that are much higher than normal, and may therefore. require higher damping forces to allow for the vehicle control required in these more extreme environments. This, however, comes with a tradeoff to vehicle ride or comfort as the higher damping forces makes the vehicle ride more stiff, transferring more of the road surface imperfections directly to the driver. Semi-active suspensions have been developed to address this by being able to vary the amount of damping force at any given time and minimize some of the trade-offs, but do not have the ability to add force (e.g., raise vehicle body or extend an individual wheel) or subtract force (e.g., lower vehicle body or pick up a wheel).

While some vehicles include componentry aimed at allowing ride height adjustment via adding or subtracting force, any adjustment to the same is typically done for the whole vehicle. Moreover, such a change in the increasing direction would tend to inhibit individual wheel articulation. Thus, a more adaptive and capable improvement may be desired.

BRIEF SUMMARY OF SOME EXAMPLES

In accordance with an example embodiment, a suspension control system for a vehicle may be provided. The system may include a plurality of wheels associated with respective corners of the vehicle, a plurality of wheel speed sensors, at least one of the wheel speed sensors corresponding to each respective one of the wheels to detect wheel speed of the each respective one of the wheels, an adaptive suspension damper associated with each of the respective corners of the vehicle, and a controller. The controller may be operably coupled to the wheel speed sensors and the adaptive suspension damper to selectively adjust a height of a selected corner of the vehicle to shift vehicle weight balance responsive to a measured wheel speed indicating a slipping wheel.

In another example embodiment, an adaptive suspension damper may be provided. The adaptive suspension damper may include a body defining a working chamber, and a sleeve operably coupled to the body to alternately open the working chamber to enable a working fluid to enter or leave the working chamber relative to compression and rebound events experienced at the adaptive suspension damper, and close the working chamber to enable the piston head to act as a hydraulic ram inside the working chamber to selectively adjust a position of a piston head in the working chamber to adjust a height of a corner of a vehicle at which the adaptive suspension damper is located.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1B illustrates a schematic diagram of a vehicle encountering an obstacle prior to conversion of the suspension system in accordance with an example embodiment;

FIG. 1C illustrates a schematic diagram of the vehicle encountering the obstacle prior along with conversion of the suspension system in accordance with an example embodiment;

DETAILED DESCRIPTION

Figure 1A:
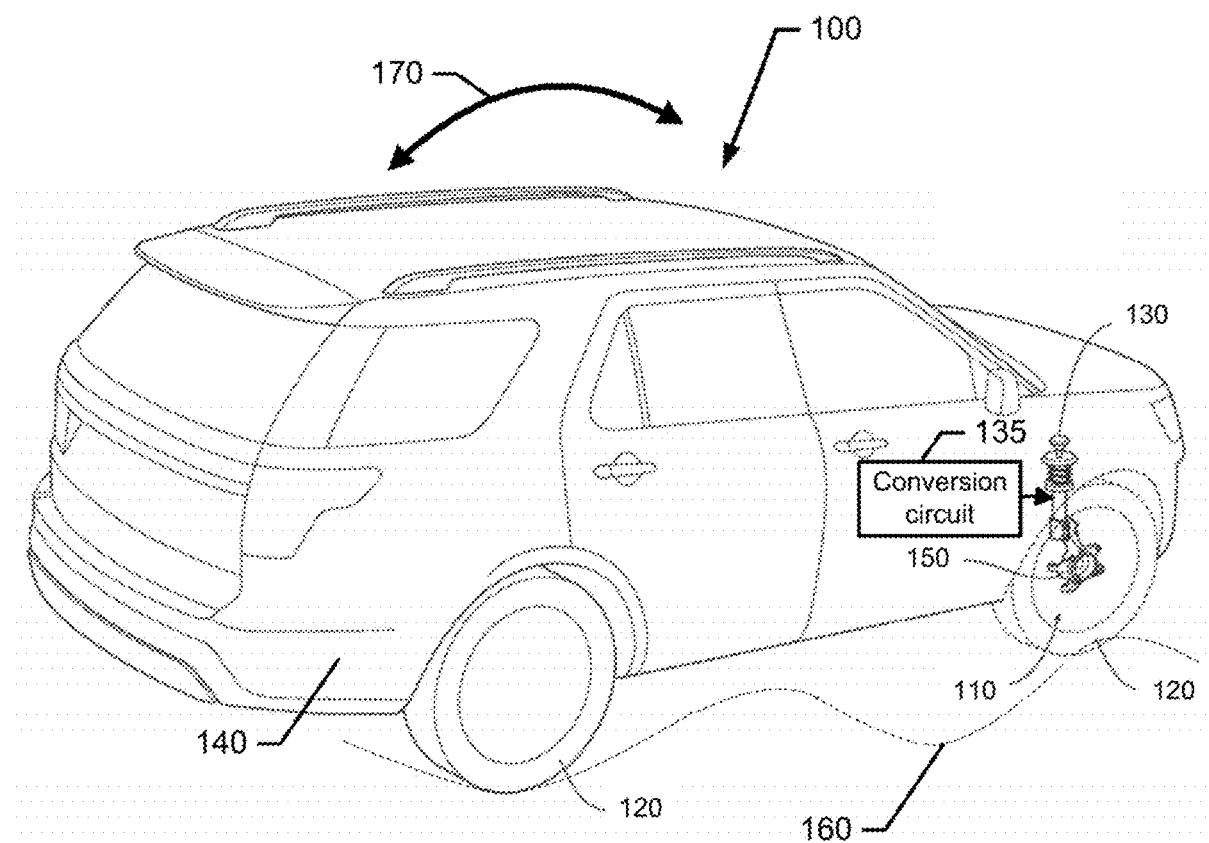
FIG. 1A illustrates a perspective view of a vehicle encountering undulating terrain and certain components of a suspension system of the vehicle in accordance with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some embodiments may provide an improved suspension system that employs convertible (or adaptive) suspension components that can transform from a semi-active suspension (e.g., damping control only) component to a fully active component (e.g., capable of adding or subtracting force). When fully active, the convertible suspension components can, on an individual wheel (or corner) basis, raise or lower ride height to transfer vehicle weight. By monitoring individual wheels of the vehicle for slippage, a control system may determine when a particular wheel is slipping, and then shift vehicle weight to transfer more weight to the wheel that is slipping. In this regard, the basic principle that frictional force (Ff) is equal to the friction coefficient (u) times the normal force (Fn) (i.e., Ff=u*Fn) can be used to transfer weight to increase the normal force (Fn) at a slipping wheel to thereby also increase frictional force to gain traction and either get unstuck or otherwise avoid getting stuck when, for example, moving over a slippery or smooth surface. This capability may be particularly useful in off road situations such as rock crawling when encountering a rock or boulder that is smooth.

In some embodiments, wheel speed sensors may be employed to detect wheel slip, and ride height sensors may monitor ride height at each respective wheel or corner of the vehicle to provide either automatic or guided instruction with respect to shifting weight by changing ride height at individual corners. Alternatively or additionally, wheel position sensors may detect wheel position or suspension travel relative to a full range of possible suspension travels that may be achieved at each corner of the vehicle. Using the convertible suspension component mentioned above, individual corners may be controlled to shift to an active suspension mode to increase or decrease wheel position or suspension travel as appropriate for each respective corner (or at least at the corner at which wheel slippage is detected).

In an example embodiment, the convertible or adaptive suspension component may be a hydraulically operated conversion body that has a first state in which the convertible suspension component acts as a hydraulic cylinder with a fixed working volume against which a piston operates for damping in a conventional way. However, a hydraulic circuit is operably coupled to the hydraulically operated conversion body to enable transition to a second state where more (or less) fluid may be provided on one side of the piston. The ability to move the piston up or down, to change wheel position relative to the full range of suspension travel, is therefore hydraulically provided so that a conversion to active suspension is possible to reposition the weight transfer of the vehicle by changing wheel position. As a result, vehicle performance and driver satisfaction may also be improved.

FIG. 1A illustrates a perspective of a vehicle 100 employing a suspension system 110 of an example embodiment. The suspension system 110 includes a plurality of wheels 120 in contact with the ground, and a convertible suspension damper 130 (e.g., a damper, shock absorber or shock that can be converted into an active suspension component) disposed between each one of the wheels 120 and a body 140 or chassis of the vehicle 100. The convertible suspension damper 130 is operably coupled to a conversion circuit 135 that is operable to convert the convertible suspension damper 130 to the active state (e.g., from a semi-active state). In some cases, the wheel 120 may be operably coupled to the convertible suspension damper 130 via a steering knuckle 150. Additional links may also be provided between the chassis and the steering knuckle 150 to stabilize the wheel 120, but such links are outside the scope of example embodiments.

As shown in FIG. 1A, uneven terrain 160 (which may include rocks or boulders in some cases) may be encountered by the vehicle 100. The body 140 of the vehicle 100 may tend to move up and down pitching as shown by double arrow 170 as the uneven terrain 160 is traversed. The pitching may not be evenly experienced at front and rear wheels, as shown in FIG. 1A. However, particularly when a discrete rock or boulder is encountered, one front (or rear) wheel may encounter the rock or boulder, when the other does not. Thus, only a single wheel could encounter a particular obstacle at any given time. This may lead to uneven effects on each wheel suspension component and, therefore cause different amounts of compression and extension of the convertible suspension damper 130 of each wheel of the suspension system 110, as the convertible suspension damper 130 on each corner of the vehicle 100 attempts to dampen out the motion experienced locally. Because the convertible suspension damper 130 typically has a limited amount of linear travel for the piston rod therein at a given ride height, uneven weight distribution of the vehicle may lead to one wheel beginning to slip. To reduce this slippage, and provide a smoother ride while maximizing the ability of the vehicle 100 to retain traction, example embodiments may configure the convertible suspension damper 130 to provide additional hydraulic response to either raise or lower ride height and thereby shift weight to the slipping wheel. The additional hydraulic response capability may be controlled by a conversion circuit 135 that will be described in greater detail below.

In this regard, as shown in FIG. 1B, a vehicle 180 is shown traversing an object 182 on the ground 184. If the vehicle 180 has an independent front suspension, the front left wheel 186 may traverse the object 182 and lift the front of the vehicle 180 accordingly. Whereas a solid axle would react by forcing the front right wheel 188 downward to maintain contact with the ground 184, an independent front suspension may not have sufficient range of suspension travel to permit the front right wheel 188 to reach the ground as shown in FIG. 1B. By employing the convertible suspension damper 130 in each of the front left wheel 186 and the front right wheel 188, an active adjustment to the suspension system may be provided as shown in FIG. 1C. In this regard, as shown in FIG. 1C, the front left wheel 186 may be effectively raised (e.g., by bleeding hydraulic fluid from the top of the piston head in the convertible suspension damper 130) as shown by arrow 190, and the front right wheel 188 may be effectively lowered (e.g., by injecting hydraulic fluid below the piston head in the convertible suspension damper 130) as shown by arrow 192. The raising of the front left wheel 186 and lowering of the front right wheel 188 may ensure maximum contact of the wheels with the ground and avoid slipping. Components and strategies for making these adjustments will be described in greater detail below.

Figure 2:
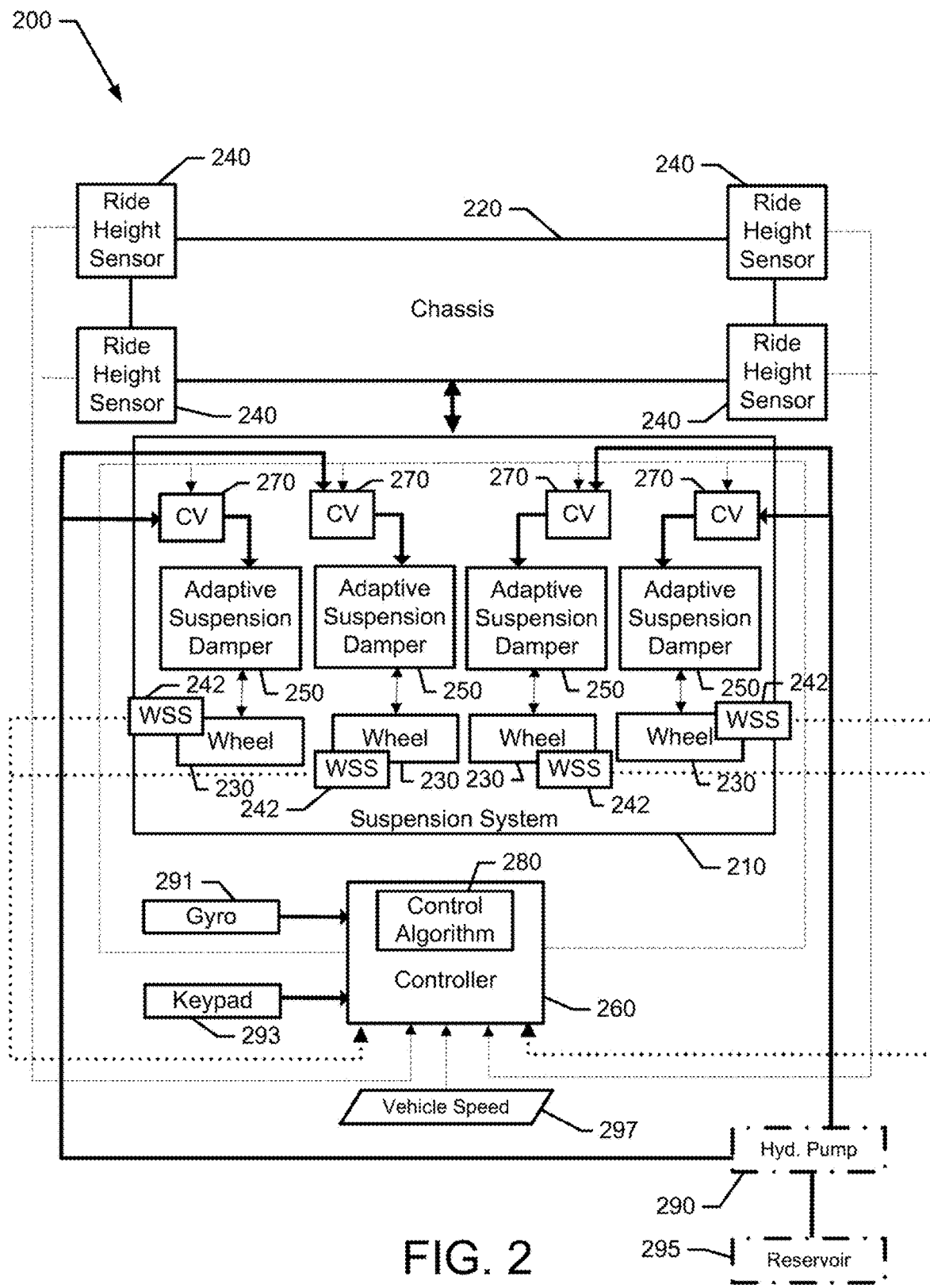
FIG. 2 illustrates a schematic diagram of a suspension system in accordance with an example embodiment.

FIG. 2 illustrates a block diagram of a vehicle 200 having an adaptive suspension system 210 in accordance with an example embodiment. As shown in FIG. 2, the adaptive suspension system 210 may operably couple a chassis 220 of the vehicle 200 to the ground. In this regard, the adaptive suspension system 210 may include wheels 230, ride height sensors 240 (which could also or alternatively include wheel position sensors wherever mentioned hereinafter), wheel speed sensors (WSS) 242, and an adaptive suspension damper 250 (an example of the convertible suspension damper 130 of FIG. 1A). One instance of each of the ride height sensors 240 and wheel speed sensors 242 may be disposed at respective corners of the chassis 220 (e.g., a front right, front left, rear right, and rear left corner). The ride height sensors 240, wheel speed sensors 242 and the adaptive suspension damper 250 may each be operably coupled to an electronic control unit (ECU) or other controller 260 of the vehicle 200.

In an example embodiment, the ride height sensors 240 may include sensors for each respective one of the wheels 230. Thus, for example, there may be a front left, front right, rear left, and rear right ride height sensor among the ride height sensors 240. Similarly, there may be a front left, front right, rear left, and rear right wheel speed sensor among the wheel speed sensors 242. Thus each individual corner or wheel may have corresponding wheel position information and/or wheel speed information associated therewith, and the wheel position information and/or wheel speed information may be updated in real time while the vehicle 200 is in operation.

The controller 260 (which may include processing circuitry including a processor and memory) may be operably coupled to an active element of the adaptive suspension damper 250 (e.g., solenoid or otherwise electrically operated control valves (CV) 270) to actuate the active element based on a control algorithm 280 stored at or accessible to the controller 260. Actuation of the active element may cause hydraulic fluid to flow through a hydraulic circuit (e.g., an example of conversion circuit 135) that includes a hydraulic pump 290 and reservoir 295. Notably, although FIG. 2 shows a single hydraulic pump, some embodiments may employ a separate pump at each corner of the vehicle 200. The hydraulic fluid may be provided to a selected one (or more) of the adaptive suspension dampers 250 or received from the selected one (or more) of the adaptive suspension dampers 250 based on the positioning of the control valves 270. For example, hydraulic fluid may be pumped from the reservoir 295 to a portion of a selected one of the adaptive suspension dampers 250 via the hydraulic pump 290 when the control valve 270 of the selected one of the adaptive suspension dampers 250 is opened and the hydraulic pump 290 is running.

In some cases, the hydraulic fluid may be pumped from the reservoir 295 to the underside of a piston of the selected one of the adaptive suspension dampers 250 to lift the ride height or wheel position of a selected corner of the vehicle 200 by raising the piston within a working chamber of the selected one of the adaptive suspension dampers 250. Alternatively, hydraulic fluid may be pumped to the top of the piston of the selected one of the adaptive suspension dampers 250 to lower the ride height or wheel position of the selected corner of the vehicle 200 by lowering the piston within the working chamber of the selected one of the adaptive suspension dampers 250. In some examples, the hydraulic fluid may be pumped only to one side (e.g., the underside), and may drain from the other side (e.g., the top) to make similar adjustments without pumping to both sides. In any case, excess fluid may return to the reservoir 295.

The controller 260 may be configured to receive wheel position information from each of the ride height sensors 240 along with wheel speed information from each of the wheel speed sensors 242. In some embodiments, the controller 260 may (via the control algorithm 280) determine when a wheel is slipping based on the wheel speed information. In this regard, for example, if measured wheel speed of one wheel is greater than measured wheel speed of the other wheels by a threshold amount, the wheel with the higher speed may be determined to be slipping. In some cases, the controller 260 may further reference vehicle speed 297 to compare to the wheel speed information to determine when a wheel is spinning. For example, if vehicle speed 297 is very low, but wheel speed is high, the speed difference may indicate that one (or more) of the wheels with a high wheel speed is spinning.

The ride height sensors 240 may provide information that is indicative of the current loading or weight balance of the vehicle 200. Based on the current loading or weight balance of the vehicle 200, and based on which wheel is slipping, the controller 260 (again via the control algorithm) may adjust the wheel position of one or more of the corners of the vehicle 200 to shift the weight balance among the corners by operating the control valve 270 of one or more of the wheels to modify damping (and ride height) for any selected ones of the adaptive suspension dampers 250 on a wheel-by-wheel basis. The shift in weight may adjust frictional force at the slipping wheel (e.g., via the equation noted above) and may provide improved traction.

In an example embodiment, the control algorithm 280 may include a lookup table that defines different weight balance strategies via assignment of different wheel position settings for the corners based on the current wheel position information and wheel speed information, and sometimes also based on vehicle speed 297 and/or other parameters. As an example, if the right front wheel is slipping resulting from losing contact with the ground, the right front wheel may be lowered toward the ground (e.g., by porting hydraulic fluid above the piston of the corresponding adaptive suspension damper 250 of the right front wheel. Simultaneously, the controller 260 may raise the left front and right rear wheels and lower the left rear wheel to force the suspension system 210 to maximize front articulation. This may overcome an inherent shortfall of many independent front suspension systems versus a solid front axle by allowing the vehicle to transverse over obstacles that may otherwise not be able to be traversed while maintaining contact with all four wheels on the ground as shown in FIGS. 1B and 1C above.

In some examples, further enhancements may also be provided by enabling individual tire contact pressure to be measured. For example, a strain gauge may be provided in the tires of each of the wheels 230 to measure contact pressure at each of the wheels 230. The strain gauge may measure a pressure at the tire contact patch of each of the wheels 230 in real time (or near real time). In such an example, the normal force may be equal to the pressure measured times the contact patch area. Thus, knowing the contact patch area, and measuring the pressure, the normal force may be known at all times by measuring the pressure via the strain gauge. The lookup table and/or control algorithm 280 may define various weight shifting strategies to improve traction, which may include noticing when a wheel is starting to lose traction by starting to reduce tire contact patch pressure.

In an example embodiment, the controller 260 may also be operably coupled to a gyro 291 or other device capable of determining leveling information for the vehicle 100 in real time. In some embodiments, the control algorithm 280 may include a primary mode in which the leveling information provided by the gyro 291 is used to modify individual corner heights associated with each wheel (as described above) to maintain the vehicle 100 substantially level. However, if the primary mode of the control algorithm 280 is unable to maintain the level state, or if wheel slip is detected, then the control algorithm 280 may shift into a secondary mode in which wheel slip is addressed as described above. Such alternative control methods may provide a single controller that can select between algorithms to adjust individual corner heights to maintain the body as level as possible (e.g., in most mild to moderate cases using the primary mode), but also help maximize wheel travel and contact to the ground-extreme cases in which wheel slippage is noticed using the techniques described herein in the secondary mode. In some cases, the controller 260 may also be operably coupled to a keypad 293. The keypad 293 may be operable to control individual wheel positions manually. For example, the keypad 293 may include a first actuator and a second actuator (e.g., shaped like a plus sign). Each such actuator may be actuated along a first axis (e.g., a horizontal axis) to increase and decrease wheel positions for one corner, and actuated along a second axis (e.g., a vertical axis) to increase and decrease wheel positions for another corner. By providing two such actuators, all four corners may be individually adjusted to manually control wheel position either lowering the wheel toward the ground or lifting the wheel away from the ground using the techniques described herein. The keypad 293 could be mounted on the steering wheel, vehicle dash, overhead console or any other place within easy reach of the driver. The keypad 293 may alternatively be implemented using switches, paddles, knobs, buttons, etc.

In an example embodiment, processes described above in reference to FIG. 2 may be utilized by employing models that are modified for respective different loading levels for the vehicle 200 (which correspond to ride height or wheel position readings). Optimization values may then be determined for corresponding different loading levels and stored in the lookup table stored at or otherwise accessible to the controller 260. During operation of the vehicle 200, the controller 260 may then be configured to take inputs from the ride height sensors 240 and wheel speed sensors 242 (and even tire strain gauges in some cases) that may be indicative of the cargo load currently borne by the vehicle 200. However, since the ride height sensors 240 are position-specific, it may not only be possible to generate an overall cargo load value, but it may be further possible to appreciate how the load is being carried by the vehicle 200. Using the information on vehicle loading determined from the ride height sensors 240, and using vehicle speed 297, the controller 260 may be configured to utilize the lookup table or control algorithm 280 to find optimal ride height, wheel position and/or damping settings for the adaptive suspension damper 250 associated with each respective one of the wheels 230. The controller 260 may then provide instruction to control the adaptive suspension dampers 250 via the control valves 270 associated with each one.

As noted above, the adaptive suspension damper 250 may have hydraulic fluid provided from an external source (e.g., the hydraulic pump 290 and reservoir 295) inserted above or below a piston (e.g., piston head) of the adaptive suspension damper 250 to lower or raise the ride height of the vehicle 200 or raise or lower wheel position at individual corners of the vehicle 200. In an example embodiment, the adaptive suspension damper 250 may therefore have ports that alternately open and close to permit movement of the hydraulic fluid around the piston (when open) to allow for position sensitive damping and then prevent additional movement of fluid and seal off the working chamber of the adaptive suspension damper 250 so that it can act as a hydraulic ram (when closed). In some embodiments, the control valves 270 may be the ports described above that alternately open or close to allow and prevent fluid from flowing into or out of the working chamber. In such an example, with the hydraulic pump 290 off and the control valves 270 to open fluid may move through selected upper or lower ports (e.g., based on solenoid operation, or other selection means) to the location above or below the piston allowing to shock to operate as a position dependent damper. In an example embodiment, the working chamber may be a cylindrical body with orifices in the side (e.g., above and below normal piston position), and a rotatable or slidable sleeve may be provided outside the working chamber with corresponding orifices that are either aligned with those of the working chamber (in the open position) or misaligned therewith (in the closed position). When the hydraulic pump 290 starts, the control valves 270 may be closed (e.g., by moving the rotatable or slidable sleeve to a position where orifices of the sleeve are not aligned with those of the working chamber to close the control valves 270 overcoming the spring biasing that keeps the control valves 270 nominally open. Thereafter, the piston may be solidly supported in the working chamber like a hydraulic cylinder, but at a new ride height or new wheel positions based on the amount of fluid inserted below or above the piston. Alternatively, the control valves 270 may set the direction for fluid flow (e.g., into or out of the body 200). FIGS. 3-9 illustrate examples of portions of the adaptive suspension damper 250 of an example embodiment.

Figure 3:
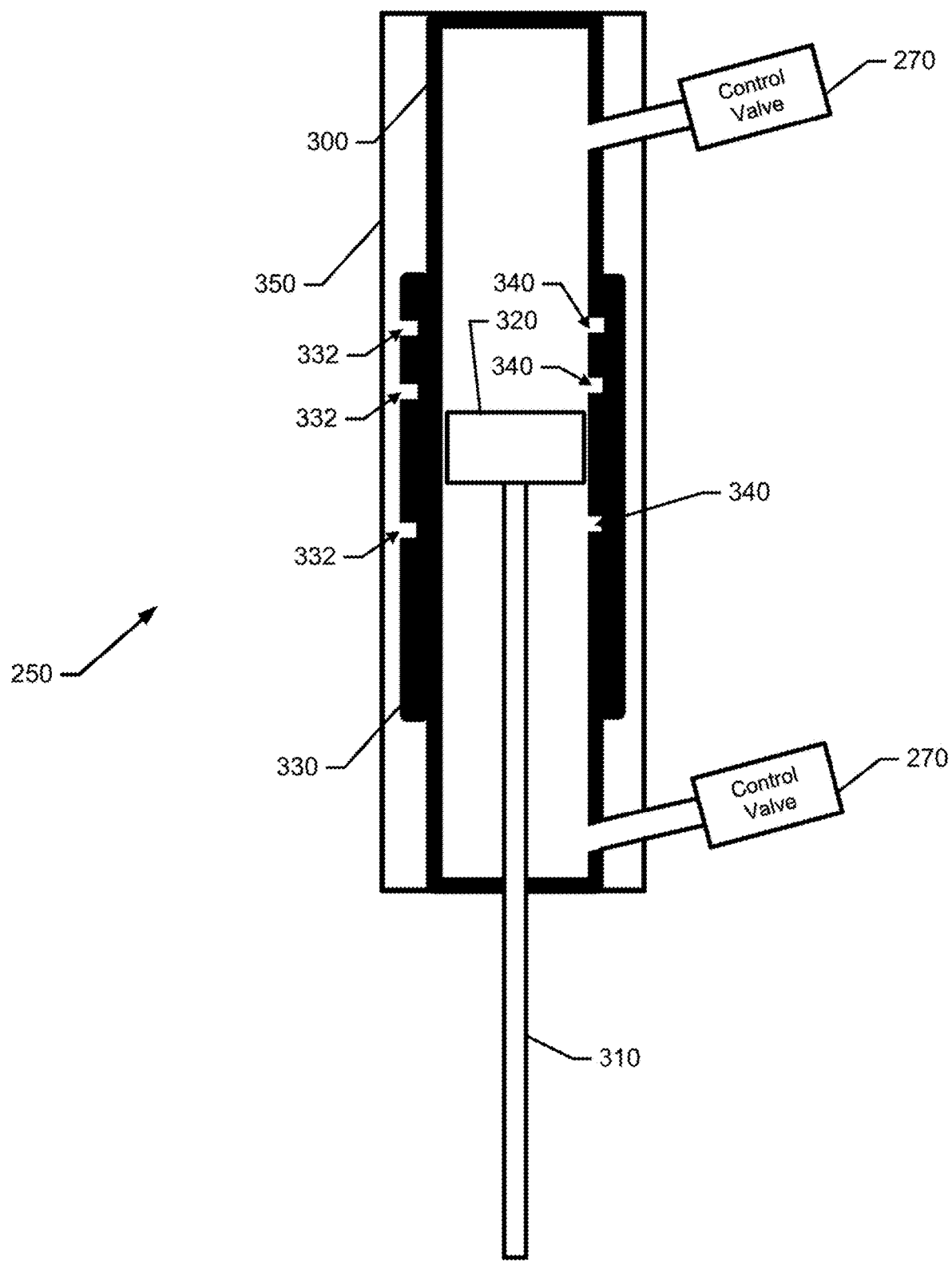
FIG. 3 illustrates a schematic diagram of a position sensitive damper in accordance with an example embodiment.

In this regard, FIG. 3 is a schematic side view of the adaptive suspension damper 250 of an example embodiment. As shown in FIG. 3, the adaptive suspension damper 250 may include a body 300 and a piston rod 310 that extends into one end of the body 300. At the opposite end of the body 300, a coupling member (not shown) may be provided with a bushing to facilitate operable coupling to the steering knuckle 150 of FIG. 1A. The piston rod 310 may include a main damper 320 (or piston head) disposed at one end thereof. Meanwhile, the opposite end of the piston rod 310 may be configured to be operably coupled to the chassis of the vehicle 100. The body 300 may include a fluid (e.g., hydraulic fluid, gas or oil) that is enabled to move (albeit restricted from free movement) from one side of the main damper 320 to the other responsive to force being applied to the piston rod 310 in either direction. In this regard, for the example of FIG. 3, compression occurs when the main damper 320 and piston rod 310 move upward and rebound occurs when the main damper 320 and piston rod 310 move downward. In either case, the main damper 320 effectively creates separate chambers, and the fluid therein opposes motion of the piston rod 310 and main damper 320. The compressed fluid resists motion of the main damper 320, but is enabled to pass by (or through) the main damper 320 in a controlled fashion. In some cases, it may be possible to adjust the amount of force exhibited by the main damper 320 (either in the design phase or after assembly), for example, by adjusting the amount of fluid in the body 300 or the rate at which fluid passes by or through the main damper 320.

In some embodiments, the control valves 270 may be solenoid operated and coordinated with operation of the hydraulic pump 290 to control insertion of fluid into the body 300 above the main damper 320 (or extraction of such fluid) to control the wheel position as noted above (i.e., lifting or lowering the wheel at each corner). The solenoid(s) may be, for example, an on/off type of solenoid that may be normally "off" when unpowered, and the solenoid(s) may be powered (by the controller 260) when the hydraulic pump 290 is on. However, other operational paradigms are also possible. In some cases, it may be further desirable for the adaptive suspension damper 250 to incorporate bypasses or blow-off paths that either pass through the main damper 320, around the main damper (e.g., via the body 300). Such bypasses or blow-off paths may facilitate control over the rate of movement of the fluid from a chamber above or below the piston head when open, and may facilitate locking the fluid in the body 300 when closed so that the adaptive suspension damper 250 can act as a hydraulic ram. In an example embodiment, the bypasses or blow-off paths may be positioned axially at different locations so that the position of the piston rod 310 within the body 300 may dictate which bypasses can be activated. In this regard, after the piston rod 310 passes the axial location of one bypass, such bypass may no longer be capable of having effect. If all bypasses have been passed, then no bypass capability exists thereafter.

In an example embodiment, a sleeve member 330 may extend around a portion of the body 300 and be coaxial therewith. The sleeve member 330 may have a diameter sufficient to fit the body 300 therein. The sleeve member 330 may include orifices 332 disposed in sidewalls thereof, which pass through the sidewalls of the sleeve member 330 in the radial direction. The sleeve member 330 may be operably coupled to the body 300 such that a spring positions the orifices 332 so that they are not aligned with orifices 340. However, above a certain pressure inside the body 300, the sleeve member 330 may be rotated to align the orifices 332 and orifices 340 to define a bypass or blow-off path within an outer body 350. In FIG. 3, these orifices 332 are not aligned with orifices 340 that are formed in sidewalls of the body 330. However, when either set of orifices 332/340 (e.g., those above or below the main damper 320) is in alignment, fluid may exit the body 300 via the correspondingly opened bypass or blow-off path to provide an internal bypass capability for the adaptive suspension damper 250. When the orifices 332/340 are thereafter taken out of alignment, the bypass or blow-off paths are no longer available, and the body 300 can be converted to a hydraulic ram. Opening of the control valve 270 to port fluid into or out of the body 300 above (or below) the main damper 320 may then either raise or lower the wheel at the corresponding corner of the vehicle 100 as described above.

In some embodiments, an infinite number of heights or wheel positions may be available between the upper and lower height/position limits. In such cases, the lookup table or other programming accessed by the controller 260 or in the control algorithm 280 may define each incremental height/position to which any particular corner should be set under the detected circumstances. However, in other cases, a limited number of heights/positions (e.g., low, medium and high) may be defined, and such discrete heights/positions may be determined again via the lookup table or other programming accessed by the controller 260 or in the control algorithm 280.

Figure 4:
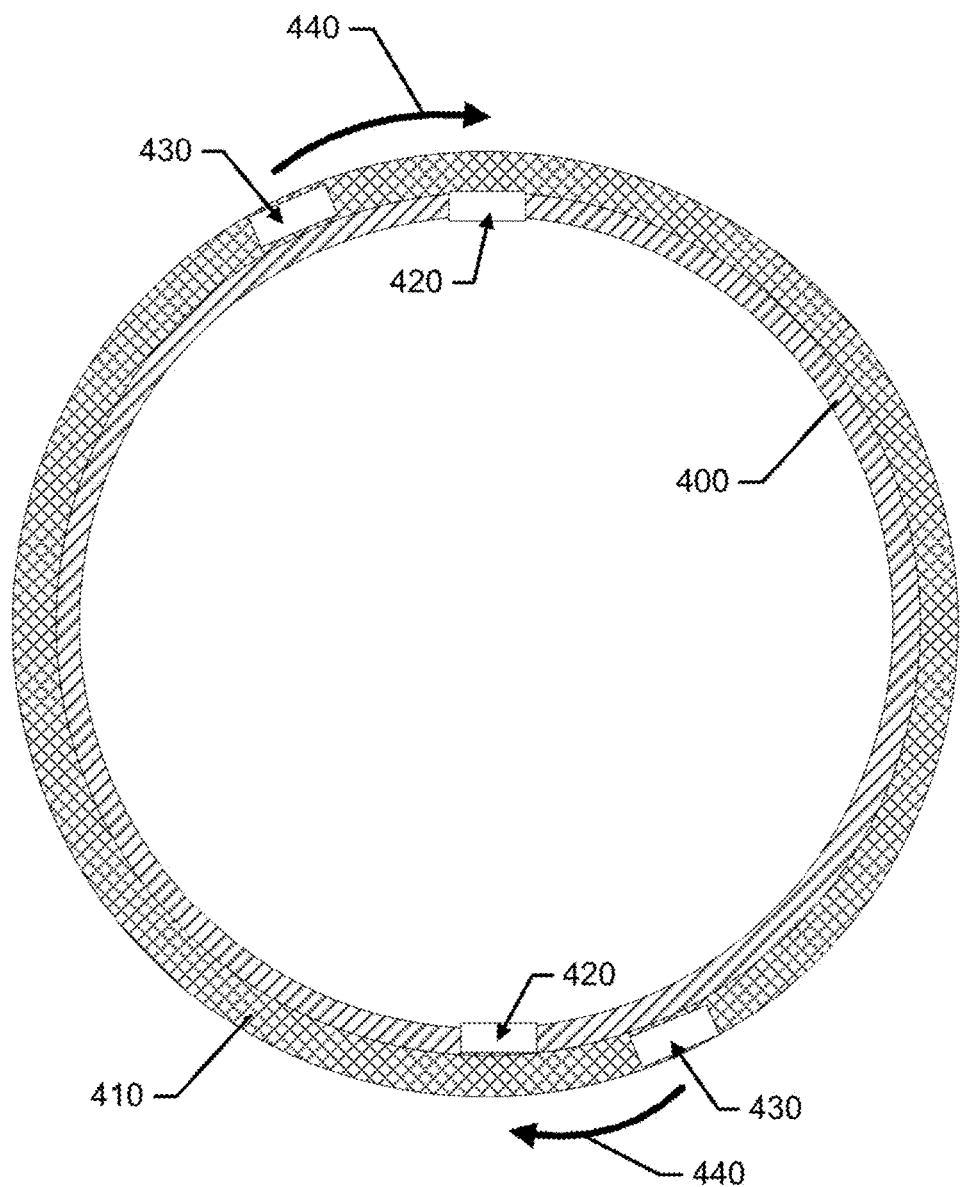
FIG. 4 illustrates a cross section view taken through a sleeve and body of a position sensitive damper in accordance with an example embodiment.
Figure 5:
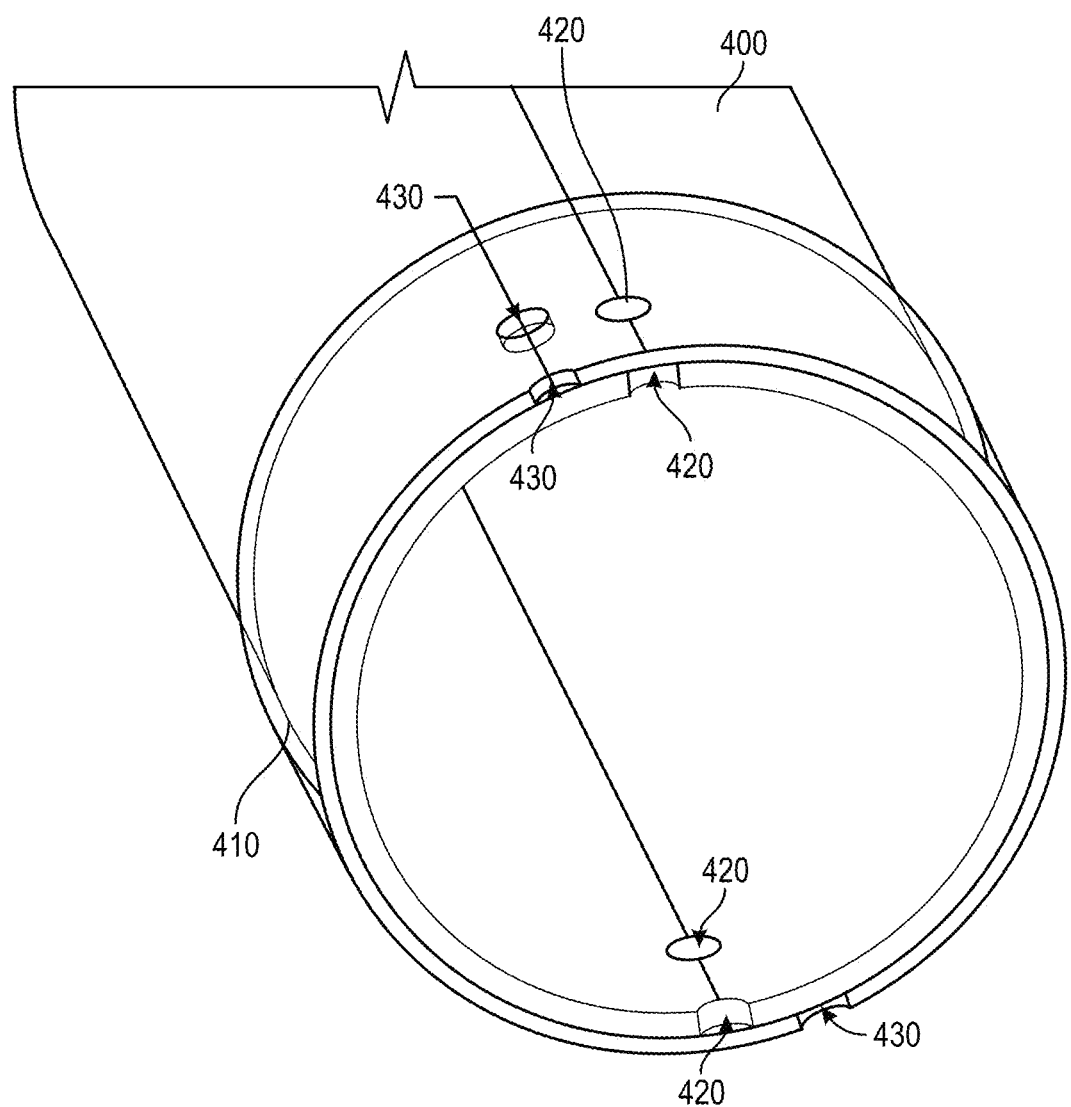
FIG. 5 is a perspective view of the sleeve and body of FIG. 4 at the same point of cross section in accordance with an example embodiment.

FIGS. 4-9 illustrate one example of a body 400 and sleeve 410 that may be used to embody the adaptive suspension damper 250 of some embodiments. In this regard, FIG. 4 is a cross section view taken through a point along the axial length of the body 400 at which orifices 420 are located. As shown in FIG. 4, orifices 430 are also located in the sleeve 410 at the same axial location. In FIG. 4, the orifices 420 and 430 are not aligned, and therefore the working chamber formed by the body 400 is sealed (or closed). However, if the sleeve 410 is rotated as shown by arrows 440, then the orifices 420 and 430 would align to permit fluid flow out of the aligned orifices 420/430 thereby defining a bypass or blow-off path. FIG. 5 is a perspective view of the same situation shown in FIG. 4 (i.e., viewing the same area at the line of cross section).

Figure 6:
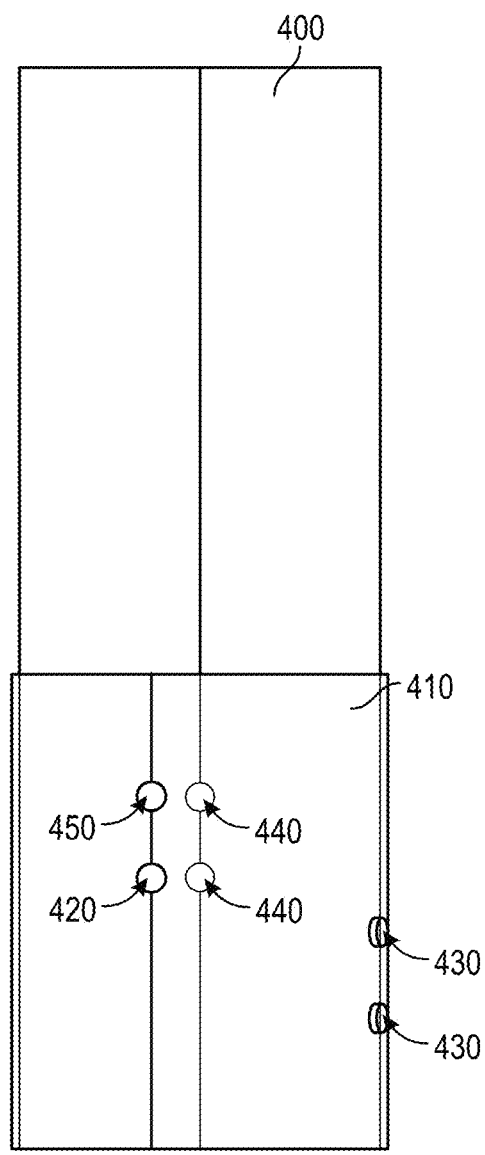
FIG. 6 is a side view of the sleeve and body of FIG. 4 while orifices therein are not aligned (or misaligned) in accordance with an example embodiment.
Figure 7:
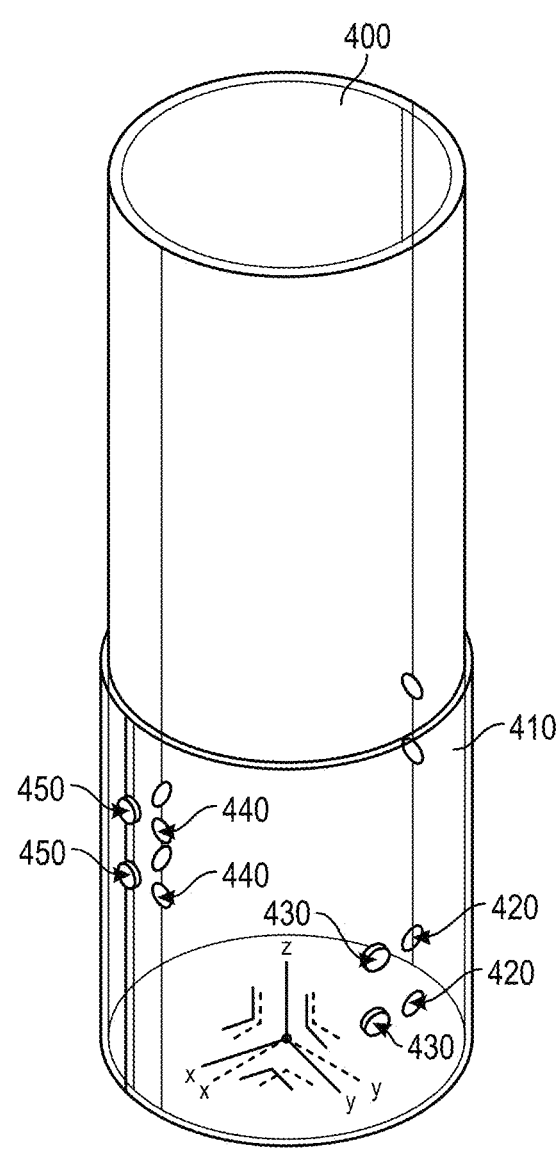
FIG. 7 is a perspective view of the sleeve and body of FIG. 6 while orifices therein are not aligned (or misaligned) in accordance with an example embodiment.
Figure 8:
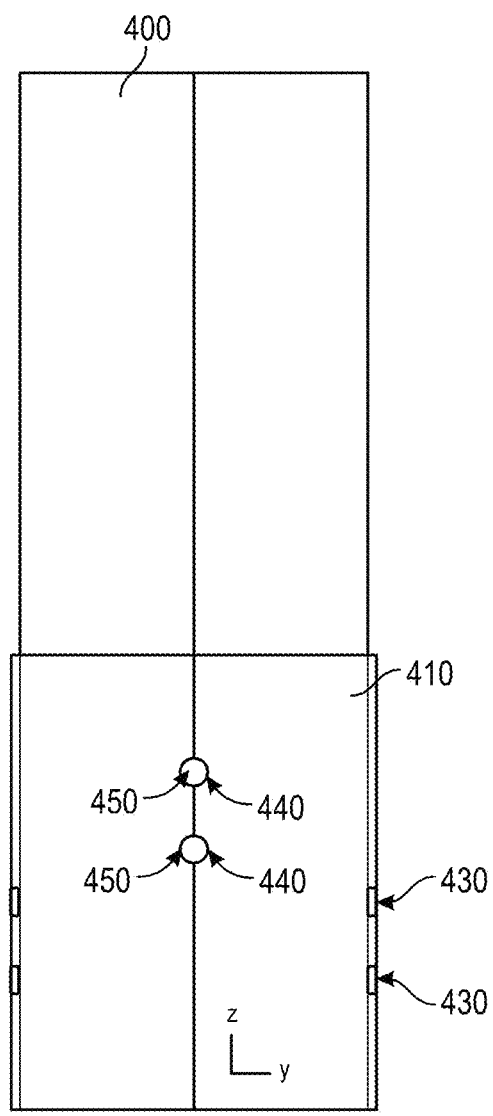
FIG. 8 is a side view of the sleeve and body of FIGS. 6 and 7 while orifices therein are aligned in accordance with an example embodiment.
Figure 9:
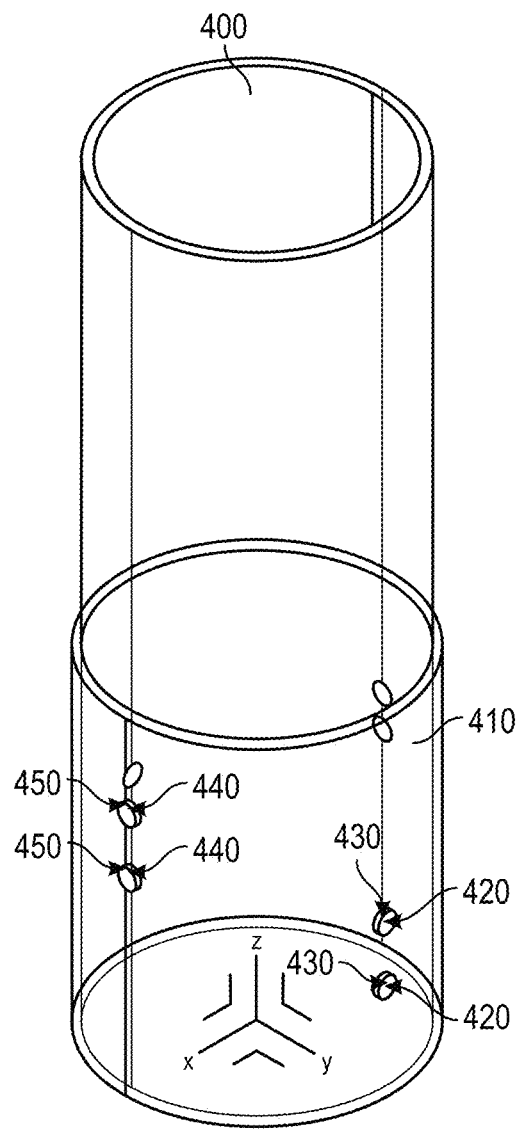
FIG. 9 is a perspective view of the sleeve and body of FIGS. 6-8 while orifices therein are aligned in accordance with an example embodiment.

FIGS. 6 and 7 show a side view of the body 400 and sleeve 410 (not in cross section) with another set of orifices 440 and 450, also in a non-aligned (closed) condition. In FIGS. 6 and 7, orifices 440 and 420 (i.e., those on the body 400) are shown shadowed since they are not actually visible. Meanwhile, FIGS. 8 and 9 show a side view of the body 400 and sleeve 410 with both orifices 420 and 430 and the other set of orifices 440 and 450 in an aligned (open) condition. Whereas the examples of FIGS. 4-9 employ a rotatable sleeve via which orifices are rotated to achieve alignment, it is also possible for the sleeve to be slid or otherwise moved axially (instead of being rotated). In such an alternative, the orifices may be aligned with each other radially, but offset axially. Sliding of the sleeve may bring the orifices into axial alignment to open, and cause axial misalignment to close the corresponding ports/valves. In the alternative embodiment as well, opening may be accomplished using hydraulic pressure, and closing may occur under spring pressure to return the sleeve to a rest position.

A suspension control system for a vehicle may therefore be provided. The system may include a plurality of wheels associated with respective corners of the vehicle, a plurality of wheel speed sensors, at least one of the wheel speed sensors corresponding to each respective one of the wheels to detect wheel speed of the each respective one of the wheels, an adaptive suspension damper associated with each of the respective corners of the vehicle, and a controller. The controller may be operably coupled to the wheel speed sensors and the adaptive suspension damper to selectively adjust a height of a selected corner of the vehicle to shift vehicle weight balance responsive to a measured wheel speed indicating a slipping wheel.

The system of some embodiments (or merely the damper itself) may include additional features, modifications, augmentations and/or the like to achieve further objectives or enhance performance of the system. The additional features, modifications, augmentations and/or the like may be added in any combination with each other. Below is a list of various additional features, modifications, and augmentations that can each be added individually or in any combination with each other. For example, the system may include a hydraulic circuit including a pump and reservoir. The hydraulic circuit may be operable to selectively adjust the height (e.g., ride height or wheel position relative to a range of suspension travel) of a selected corner. In an example embodiment, the adaptive suspension damper may include a body defining a working chamber and a sleeve operably coupled to the body to alternately open the working chamber to enable a working fluid to enter or leave the working chamber to selectively adjust the height of the selected corner, and close to enable a piston head to act as a damper inside the working chamber relative to compression and rebound events experienced at the adaptive suspension damper. In some cases, the body may include a first orifice on a first side of the piston head and a second orifice on a second side of the piston head, the sleeve may include a third orifice at a same axial position as the first orifice, and a fourth orifice at a same axial position as the second orifice. The sleeve may be movable to align the first orifice with the third orifice and the second orifice with the fourth orifice to open the working chamber. In an example embodiment, the sleeve may be movable to misalign the first orifice with the third orifice and the second orifice with the fourth orifice to close the working chamber. In some cases, the sleeve may be moved to open the working chamber responsive to operation of the hydraulic circuit, and the sleeve may be spring loaded to close the working chamber responsive to the hydraulic circuit not operating. In an example embodiment, the controller may control one or more solenoids that open or close bypass paths in or around the piston head. In some cases, the controller may compare the wheel speed of the each respective one of the wheels to determine if the measured wheel speed is different from other wheel speeds by greater than a threshold amount. In an example embodiment, the controller may compare the wheel speed of the each respective one of the wheels to vehicle speed to determine if the measured wheel speed is different from the vehicle speed by greater than a threshold amount. In some cases, the controller may execute a control algorithm to shift vehicle weight balance by adjusting the height of the selected corner. In an example embodiment, the controller may execute the control algorithm automatically and without driver input. In some cases, each of the tires may include a strain gauge to detect contact pressure, and the control algorithm may receive information indicative of the contact pressure to adjust the vehicle weight balance when the contact pressure of one of the each of the wheels is below a threshold. In an example embodiment, the control algorithm may access a lookup table to determine how to shift the vehicle weight balance. In some cases, the controller may execute the control algorithm as a leveling algorithm based on leveling information provided by a gyro, and the controller may interface with a keyboard to accept user inputs to manually adjust the height of the selected corner.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An adaptive suspension damper comprising:
a body defining a working chamber; and
a sleeve operably coupled to the body to alternately:
open the working chamber to enable a working fluid to enter or leave the working chamber to selectively adjust a damping force based on position of a piston head in the working chamber relative to compression and rebound events experienced at the adaptive suspension damper, and
close the working chamber to enable the piston head to act as a hydraulic ram inside the working chamber to adjust a height of a corner of a vehicle at which the adaptive suspension damper is located.

2. The adaptive suspension damper of claim 1, wherein the body includes a first orifice on a first side of the piston head and a second orifice on a second side of the piston head,
wherein the sleeve includes a third orifice at a same axial position as the first orifice, and a fourth orifice at a same axial position as the second orifice, and
wherein the sleeve is movable to align the first orifice with the third orifice and the second orifice with the fourth orifice to open the working chamber.

3. The adaptive suspension damper of claim 2, wherein the sleeve is movable to misalign the first orifice with the third orifice and the second orifice with the fourth orifice to close the working chamber.

4. The adaptive suspension damper of claim 3, wherein the sleeve is moved to close the working chamber responsive to operation of a hydraulic circuit, and
wherein the sleeve is spring loaded to open the working chamber responsive to the hydraulic circuit not operating.

5. The adaptive suspension damper of claim 1, wherein a transition between opening and closing the working chamber is controlled by a controller, and
wherein the controller controls one or more solenoids that open or close bypass paths in or around the piston head.

6. The adaptive suspension damper of claim 5, wherein the controller is operably coupled to wheel speed sensors and the adaptive suspension damper to selectively adjust a height of a selected corner of the vehicle to shift vehicle weight balance responsive to a measured wheel speed indicating a slipping wheel.

7. The adaptive suspension damper of claim 1, wherein a hydraulic circuit comprising a pump and reservoir is operably coupled to the controller, and
wherein the hydraulic circuit is operable by the controller to selectively adjust the height of the selected corner.

8. A suspension control system for a vehicle, the system comprising:
a plurality of wheels associated with respective corners of the vehicle;
a plurality of wheel speed sensors, at least one of the wheel speed sensors corresponding to each respective one of the wheels to detect wheel speed of the each respective one of the wheels;
an adaptive suspension damper associated with each of the respective corners of the vehicle; and
a controller operably coupled to the wheel speed sensors and the adaptive suspension damper to selectively adjust a height of a selected corner of the vehicle to shift vehicle weight balance responsive to a measured wheel speed indicating a slipping wheel,
wherein the system comprises a hydraulic circuit comprising a pump and reservoir, and
wherein the hydraulic circuit is operable to selectively adjust the height of a selected corner.

9. The system of claim 8, wherein the adaptive suspension damper comprises a body defining a working chamber and a sleeve operably coupled to the body to alternately open the working chamber to enable a working fluid to enter or leave the working chamber relative to compression and rebound events experienced at the adaptive suspension damper, and close to enable a piston head to act as a hydraulic ram inside the working chamber to selectively adjust the height of the selected corner.

10. The system of claim 9, wherein the body includes a first orifice on a first side of the piston head and a second orifice on a second side of the piston head,
   wherein the sleeve includes a third orifice at a same axial position as the first orifice, and a fourth orifice at a same axial position as the second orifice, and
   wherein the sleeve is movable to align the first orifice with the third orifice and the second orifice with the fourth orifice to open the working chamber.

11. The system of claim 10, wherein the sleeve is movable to misalign the first orifice with the third orifice and the second orifice with the fourth orifice to close the working chamber.

12. The system of claim 11, wherein the sleeve is moved to close the working chamber responsive to operation of the hydraulic circuit, and
   wherein the sleeve is spring loaded to open the working chamber responsive to the hydraulic circuit not operating.

13. The system of claim 9, wherein the controller controls one or more solenoids that open or close bypass paths in or around the piston head.

14. The system of claim 8, wherein the controller executes a control algorithm to shift vehicle weight balance by adjusting the height of the selected corner.

15. The system of claim 14, wherein the controller executes the control algorithm as a leveling algorithm based on leveling information provided by a gyro, and
   wherein the controller interfaces with a keyboard to accept user inputs to manually adjust the height of the selected corner.

16. The system of claim 14, wherein each of the wheels includes a strain gauge to detect contact pressure, and
   wherein the control algorithm receives information indicative of the contact pressure to adjust the vehicle weight balance when the contact pressure of one of the each of the wheels is below a threshold.

17. The system of claim 14, wherein the control algorithm accesses a lookup table to determine how to shift the vehicle weight balance.

18. The system of claim 8, wherein the controller compares the wheel speed of the each respective one of the wheels to determine if the measured wheel speed is different from other wheel speeds by greater than a threshold amount.

19. The system of claim 8, wherein the controller compares the wheel speed of the each respective one of the wheels to vehicle speed to determine if the measured wheel speed is different from the vehicle speed by greater than a threshold amount.

\* \* \* \* \*